US009823783B2

(12) United States Patent
Kubo (10) Patent No.: US 9,823,783 B2
(45) Date of Patent: *Nov. 21, 2017

(54) OPTICAL SIGNAL OUTPUT APPARATUS, SIGNAL PROCESSING APPARATUS, SIGNAL PROCESSING METHOD, IMAGING APPARATUS, AND PROJECTOR

(71) Applicant: Sony Corporation, Tokyo (JP)

(72) Inventor: Motoki Kubo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/402,289

(22) Filed: Jan. 10, 2017

(65) Prior Publication Data

US 2017/0123594 A1    May 4, 2017

Related U.S. Application Data

(63) Continuation of application No. 13/415,053, filed on Mar. 8, 2012, now Pat. No. 9,594,460.

(30) Foreign Application Priority Data

Mar. 23, 2011    (JP) ................................ 2011-064051

(51) Int. Cl.
*H04B 10/00* (2013.01)
*G06F 3/042* (2006.01)

(52) U.S. Cl.
CPC .................................. *G06F 3/0425* (2013.01)

(58) Field of Classification Search
None
See application file for complete search history.

(56) References Cited

U.S. PATENT DOCUMENTS

| 5,502,459 A | 3/1996 | Marshall |
| 7,119,788 B2 | 10/2006 | Gomi et al. |
| 2002/0011987 A1 | 1/2002 | Kitazawa |
| 2003/0021492 A1* | 1/2003 | Matsuoka ............ G06F 3/0426 382/295 |
| 2003/0193789 A1 | 10/2003 | Karlicek, Jr. |
| 2010/0188004 A1 | 7/2010 | Baggen et al. |

(Continued)

FOREIGN PATENT DOCUMENTS

| JP | 53-66122 | 6/1978 |
| JP | 4-37922 | 2/1992 |
| JP | 10-63421 | 3/1998 |

(Continued)

OTHER PUBLICATIONS

Office Action issued in corresponding Japanese Application No. 2015-163803 dated Jul. 14, 2016.

(Continued)

*Primary Examiner* — Ken N Vanderpuye
*Assistant Examiner* — David Lambert
(74) *Attorney, Agent, or Firm* — Haug Partners LLP; William S. Frommer (57) ABSTRACT

An optical signal output apparatus includes: a switch having a first state or a second state in accordance with user's operation; and an optical signal output section that outputs a low-level optical signal when the switch is in the first state, whereas outputting a high-level optical signal when the switch is in the second state.

14 Claims, 8 Drawing Sheets

(56) References Cited

U.S. PATENT DOCUMENTS

2010/0316389 A1    12/2010    Walewski

FOREIGN PATENT DOCUMENTS

| | | |
|---|---|---|
| JP | 2002-73267 | 3/2002 |
| JP | 2002-140058 | 5/2002 |
| JP | 2002-229726 | 8/2002 |
| JP | 2005-148560 | 6/2005 |
| JP | 2006-243850 | 9/2006 |
| JP | 2006-277552 | 10/2006 |
| WO | WO 2009/119716 | 10/2009 |
| WO | WO 2010/101207 | 9/2010 |

OTHER PUBLICATIONS

Office Action issued in corresponding Japanese Application No. 2015-163803 dated Nov. 21, 2016.
Office Action issued in corresponding Japanese Application No. 2015-163803 dated Nov. 24, 2016 and its English Translation.

\* cited by examiner

OPTICAL SIGNAL OUTPUT APPARATUS, SIGNAL PROCESSING APPARATUS, SIGNAL PROCESSING METHOD, IMAGING APPARATUS, AND PROJECTOR

This is a continuation of application Ser. No. 13/415,053, filed Mar. 8, 2012, which claims priority under 35 USC 119 to Japanese Application No. 2011-064051, filed in Japan Mar. 23, 2011, the entirety of which is incorporated herein by reference.

FIELD

The present technology relates to an optical signal output apparatus, a signal processing apparatus, a signal processing method, an imaging apparatus, and a projector, and particularly to an optical signal output apparatus, a signal processing apparatus, a signal processing method, an imaging apparatus, and a projector capable of correctly distinguishing two signals having the same wavelength band but used for different purposes from each other.

BACKGROUND

A projector is, for example, connected to a personal computer and used to make a presentation or any other performance. In this case, the projector is used to project the same image as that displayed on the personal computer on a screen or any other projection surface.

Such a projector is provided with a remote control unit that allows a user to change input video images and adjust a projected image. The remote control unit sends an infrared signal according to user's operation to the projector. A pointing stick for pointing an image projected and displayed by the projector is also frequently used in a presentation.

There have been known data input apparatus and image display apparatus to which data is inputted by using an input pen that emits infrared light or blue light (see JP-A-2006-243850 and JP-A-53-66122, for example).

SUMMARY

Among pointing sticks and other similar components used in presentations and other situations, there are pointing sticks and other similar components that output infrared light. It is important in this case to correctly distinguish an infrared signal from a remote control unit of a projector and an infrared signal from a pointing stick from each other in order to prevent malfunction.

Thus, it is desirable to correctly distinguish two signals having the same wavelength band but used for different purposes.

An embodiment of the present technology is directed to an optical signal output apparatus including a switch having a first state or a second state in accordance with user's operation, and an optical signal output section that outputs a low-level optical signal when the switch is in the first state, whereas outputting a high-level optical signal when the switch is in the second state.

In the embodiment of the present technology, a low-level optical signal is outputted when the switch is in the first state, whereas a high-level optical signal is outputted when the switch is in the second state.

Another embodiment of the present technology is directed to a signal processing apparatus including an optical signal processor that, when an optical signal having a signal level greater than or equal to a predetermined threshold is detected based on an imaged signal obtained by an imaging section that images an optical signal outputted from the optical signal output apparatus that outputs a low-level optical signal or a high-level optical signal, outputs information on the position of the optical signal.

The another embodiment of the present technology also directed to a signal processing method including allowing a signal processing apparatus, that performs signal processing based on an imaged signal obtained by an imaging section that images an optical signal outputted from an optical signal output apparatus that outputs a low-level optical signal or a high-level optical signal, to output information on the position of the optical signal when an optical signal having a signal level greater than or equal to a predetermined threshold is detected.

In the another embodiment of the present technology, the information on the position of the optical signal is outputted when the optical signal having a signal level greater than or equal to the predetermined threshold is detected.

Still another embodiment of the present technology is directed to an imaging apparatus including an imaging section that images an optical signal outputted from an optical signal output apparatus that outputs a low-level optical signal or a high-level optical signal, and an optical signal processor that, when an optical signal having a signal level greater than or equal to a predetermined threshold is detected based on an imaged signal obtained by an imaging section, outputs information on the position of the optical signal.

Yet another embodiment of the present technology is directed to a projector including the imaging apparatus according to the embodiment of the present technology.

In the embodiments of the present technology, information on the position of the optical signal is outputted when the imaged optical signal has a signal level greater than or equal to a predetermined threshold.

Each of the optical signal output apparatus, the signal processing apparatus, and the imaging apparatus may be an independent apparatus or an internal block constituting a single apparatus.

According to the embodiments of the present technology, two signals having the same wavelength band but used for different purposes can be correctly distinguished from each other.

DETAILED DESCRIPTION

[Example of Configuration of Presentation System]

The configuration of a system to which the present technology is applied and situations in which the system is used will first be described with reference to FIG. 1.

Figure 1:
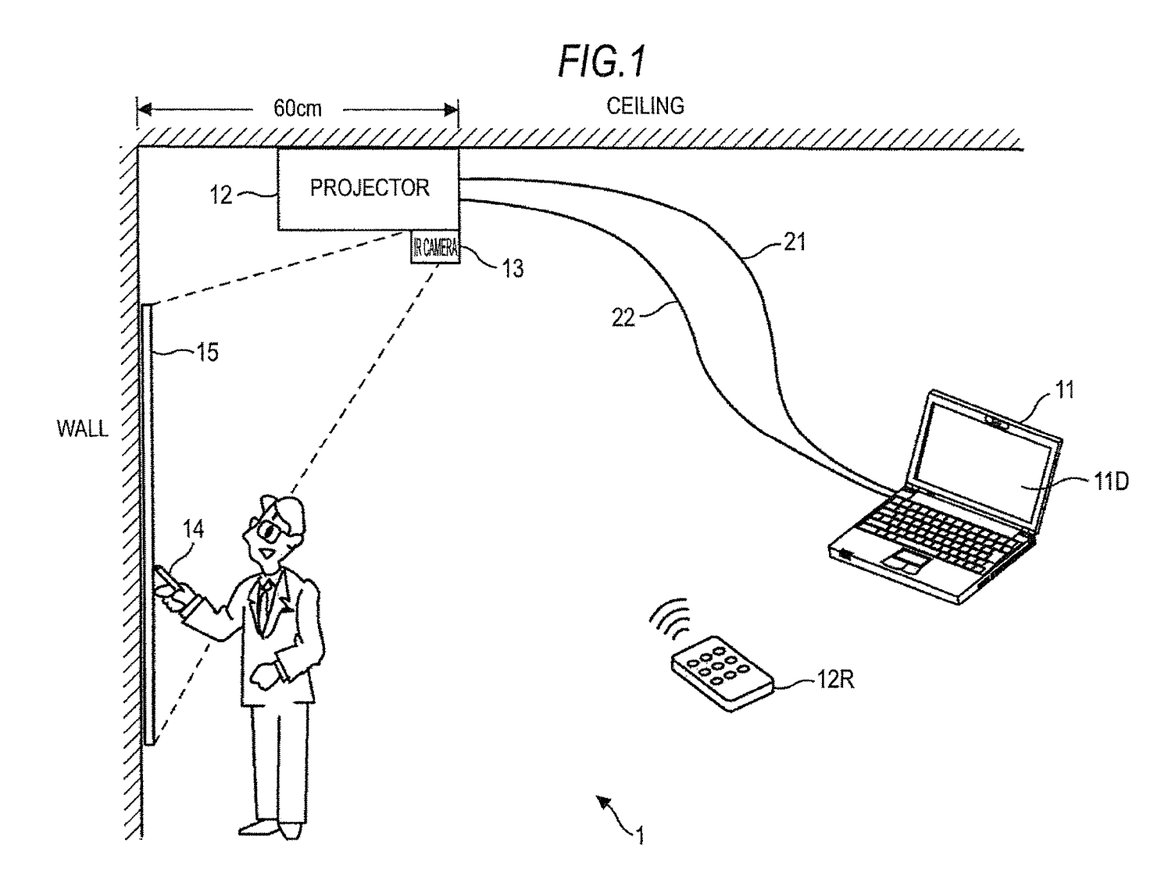
FIG. 1 describes the configuration of a system to which the present technology is applied and situations in which the system is used.

FIG. 1 shows an example of the configuration of a presentation system 1 useful for making a presentation, for example, in a conference room.

The presentation system 1 includes a personal computer 11, a projector 12 and a remote control unit 12R associated therewith, an IR (infrared radiation) camera 13, and a pointing pen 14.

The personal computer 11 (hereinafter referred to as PC 11) is connected to the projector 12 via a video cable 21 and a control signal cable 22. The video cable 21 is, for example, an analog RGB cable, and the control signal cable 22 is, for example, a USB (universal serial bus) cable.

The PC 11 has a presentation application installed therein. The presentation application activated in the PC 11 displays an image for a presentation created by a user in advance on a display 11D and outputs an image signal carrying the image displayed on the display 11D to the projector 12 via the video cable 21.

The presentation application activated in the PC 11 further acquires click information that is detected by the IR camera 13 via the control signal cable 22 and the same as click information provided when the user clicks on a predetermined position on the image displayed on the display 11D.

The projector 12 projects the same image as that displayed on the display 11D on a wall or a screen 15, which is a projection surface, based on the image signal inputted from the PC 11 via the video cable 21. The size of the image displayed on the projection surface (screen size) can, for example, be about 80 inches. The projector 12, when it includes a projection lens having a short focal length or an ultra-short focal length, is fixed with a fixture to the ceiling set apart from the projection surface by about 60 cm. The projector 12 may, of course, alternatively be of tabletop installation type.

The projector 12 receives an infrared-light remote signal from the remote control unit 12R and performs predetermined control according to the remote signal, such as changing input video images and adjusting a displayed image.

The projector 12, to which the IR camera 13 is connected, further outputs the click information acquired from the IR camera 13 to the PC 11 via the control signal cable 22.

The user, who is a presenter of the presentation, grips and operates the pointing pen 14. The pointing pen 14 keeps outputting infrared light (optical signal). The pointing pen 14 includes a built-in switch 61 (FIG. 2) that is turned on and off in response to a force externally exerted on a front end of the pointing pen 14 when the front end comes into contact with the screen 15 or any other object. When the switch 61 is turned on or off, the output level of the infrared light changes. Specifically, when the front end comes into contact with a predetermined object, the pointing pen 14 outputs high-level infrared light, otherwise outputting low-level infrared light.

The IR camera (imaging apparatus) 13, which is connected to the projector 12, captures an infrared image having the size of a projection area of the projector 12 or a size slightly larger than the projection area. The IR camera 13 captures the low-level infrared light that keeps being emitted from the pointing pen 14 and detects change in the output level from the low level to the high level.

The IR camera 13, when it detects change in the output level from the low level to the high level, outputs click information to the projector 12, the click information representing that the user had clicked on a position where the high-level infrared light has been detected. The projector 12 then outputs the click information to the personal computer 11.

In the thus configured presentation system 1, the user touches the screen 15 or any other projection surface with the pointing pen 14 in a predetermined position on the image projected from the projector 12. The IR camera 13 captures the low-level infrared light that keeps being outputted from the pointing pen 14 and outputs click information to PC 11 via the projector 12 when the output level of the infrared light has changed from the low level to the high level. The user can thus click on the projected image as if the user clicked on the image displayed on the display 11D. The pointing pen 14 is what is called an interactive pen because the user can manipulate the image on the PC 11 by using the pointing pen 14.

To click on the projected image as if the user clicked on the image on the display 11D by using the interactive pointing pen 14, it is necessary to relate a position on the projected image to a position on the image displayed on the display 11D. To this end, the presentation application operates not only in a normal mode (presentation mode) but also in a calibration mode. In the calibration mode, the presentation application calculates and stores a correction value that allows a position on the projected image to coincide with a position on the image displayed on the display 11D.

[Functional Configuration Block Diagram of Presentation System 1]

Figure 2:
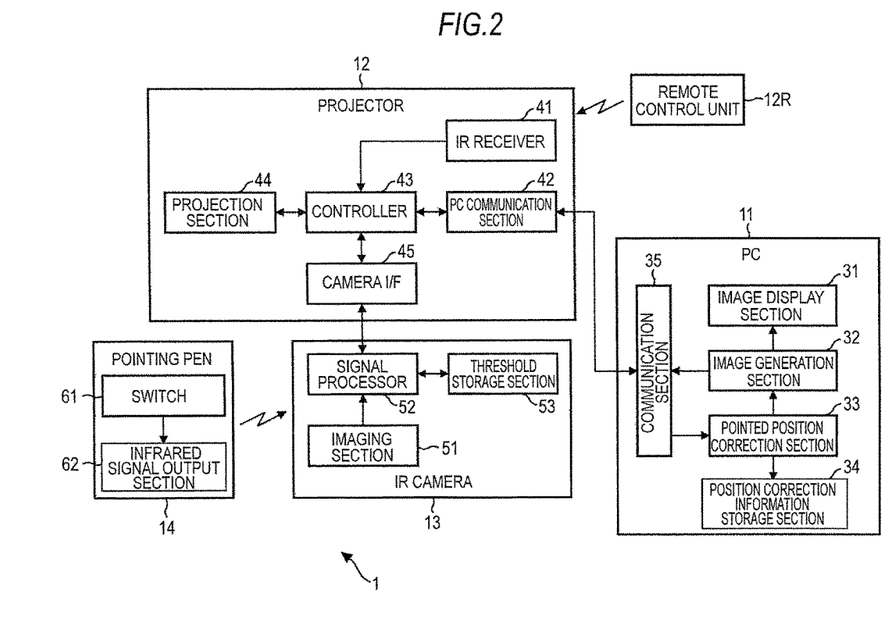
FIG. 2 is a block diagram showing an example of the functional configuration of the presentation system shown in FIG. 1.

FIG. 2 is a block diagram showing an example of the functional configuration of the presentation system 1.

The PC 11 includes at least an image display section 31, an image generation section 32, a pointed position correction section 33, a position correction information storage section 34, and a communication section 35.

The image display section 31 corresponds to the display 11D in FIG. 1 and displays an image generated by the image generation section 32.

The image generation section 32 reads a presentation file created in advance and stored in a predetermined storage section, generates an image for the presentation created in the file, and outputs an image signal carrying the image to the image display section 32 and the communication section 35. The image generation section 32 further performs other kinds of control, such as displaying the following image for the presentation, based on click information supplied from the pointed position correction section 33.

The pointed position correction section 33 acquires click information supplied from the projector 12 via the communication section 35. The pointed position correction section 33 then corrects the position contained in the click information based on a correction value stored in the position correction information storage section 34 and supplies the corrected click information to the image generation section 32.

The pointed position correction section 33 further calculates a correction value that allows a position on the projected image to coincide with a corresponding position on the image displayed on the display 11D and stores the calculated correction value in the position correction information storage section 34.

The image generation section 32 and the pointed position correction section 33 are, for example, formed by executing the presentation application in a CPU (central processing unit), a RAM (random access memory), and other components.

The position correction information storage section 34 is formed of a hard disk drive or any other recording medium in the personal computer 11 and stores the correction value calculated by the pointed position correction section 33 in the calibration mode.

The communication section 35 is formed of a communication section, a driver for the application, and other components in the personal computer 11 and communicates an image signal, click information, and other predetermined pieces of information with the projector 12.

In the present embodiment, the PC 11 and the projector 12 are connected to each other via two cables, the video cable 21 and the control signal cable 22, as described with reference to FIG. 1, but an image signal and control information (such as click information) may alternatively be sent and received, for example, via a single USB cable.

The communication between the PC 11 and the projector 12 is not necessarily performed based on wired communication but may alternatively be performed based on wireless communication using, for example, a wireless LAN or Bluetooth®.

The projector 12 includes at least an IR receiver 41, a PC communication section 42, a controller 43, a projection section 44, and a camera I/F 45.

The IR receiver 41 receives an infrared-light remote signal from the remote control unit 12R and supplies the remote signal to the controller 43.

The PC communication section 42 acquires an image signal inputted from the PC 11 and supplies the image signal to the controller 43. The PC communication section 42 further acquires click information supplied from the controller 43 and outputs the click information to the PC 11. When the application in the PC 11 operates in the calibration mode, information on the calibration mode is also inputted from the PC 11 and supplied to the IR camera 13 via the controller 43 and the camera I/F 45.

The controller 43 is formed of a CPU, a RAM, a DSP (digital signal processor), a ROM (read only memory), and other components and controls the entire projector. The controller 43, for example, changes input video images and adjusts (corrects) a projected image based on a remote signal from the IR receiver 41. The controller 43 further supplies the projection section 44 with the image signal inputted from the PC 11 via the PC communication section 42 and supplies the PC communication section 42 with click information inputted from the IR camera 13 via the camera I/F 45.

The projection section 44 is formed of an optical lens, a liquid crystal panel, a light source, and other components and projects an image based on the image signal supplied from the controller 43.

The camera I/F 45 outputs the information on the calibration mode supplied from the controller 43 to the IR camera 13. The camera I/F 45 further supplies the controller 43 with the click information inputted from the IR camera 13.

The IR camera 13 includes at least an imaging section 51, a signal processor 52, and a threshold storage section 53.

The imaging section 51 is formed of a CCD (charge coupled device) sensor, a CMOS (complementary metal oxide semiconductor) sensor, or any other imaging device, an infrared filter that transmits infrared light, and other components. The imaging section 51 supplies the signal processor 52 with an infrared optical signal detected within an (two-dimensional) imaging area of the imaging device as an imaged signal.

The signal processor 52 calculates the position of the infrared light emitted from the pointing pen 14 and the signal level of the infrared light based on the imaged signal supplied from the imaging section 51.

In the calibration mode, the signal processor 52 uses the two types of signal level, the low level and the high level, of the infrared light emitted from the pointing pen 14 to determine a threshold based on which the signal levels are identified and stores the threshold in the threshold storage section 53.

On the other hand, in the normal mode, the signal processor 52 detects the timing at which a calculated signal level of the infrared light becomes greater than or equal to the threshold. The pointing pen 14 outputs high-level infrared light when the switch 61 is turned on, otherwise outputting low-level infrared light, as described above. The signal processor 52 detects the timing at which the level of the infrared light from the pointing pen 14 changes from the low level to the high level by judging whether an acquired signal level is greater than or equal to the threshold.

Further, in the present embodiment, the signal processor 52 sets a position of the low-level infrared light immediately before the detected timing as a reference position and judges whether the position where the level of the infrared light from the pointing pen 14 has become the high level is within a predetermined area from the reference position. The predetermined area can, for example, be one of the regions obtained by dividing the imaging area of the imaging section 51 into a plurality of regions, such as 9 regions or 4 regions. Dividing the imaging area allows the area within which the high-level infrared light is detected to be reduced, whereby a processing load on the signal processor 52 is reduced and the responsivity thereof is improved accordingly. When the processing performance (computing performance) of the signal processor 52 is sufficient, the area within which the high-level infrared light is detected may not be narrowed, but the entire imaging area may be used to detect the high-level infrared light. That is, the judgment whether or not the position where the high-level light is detected is within a predetermined area from the reference position can be omitted.

The signal processor 52, when it detects that the level of the infrared light from the pointing pen 14 has changed from the low level to the high level, outputs click information representing that the user has clicked on the position of the infrared light at that timing to the camera I/F 45 in the projector 12.

The threshold storage section 53 stores the threshold which is calculated by the signal processor 52 in the calibration mode and based on which the low level and the high level of the infrared light from the pointing pen 14 are identified.

The pointing pen 14 includes at least the switch 61 and an infrared signal output section 62.

The switch 61 is turned on and off when the front end of the pointing pen 14 is pressed.

The infrared signal output section 62 is formed, for example, of an LED (light emitting diode) that outputs infrared light (light having wavelength band ranging from 780 to 1000 nm), and the output (emission) level of the infrared light is changed from the higher level to the lower level or vice versa in accordance with the ON/OFF state of the switch 61.

[External Appearance of Pointing Pen 14]

Figure 3:
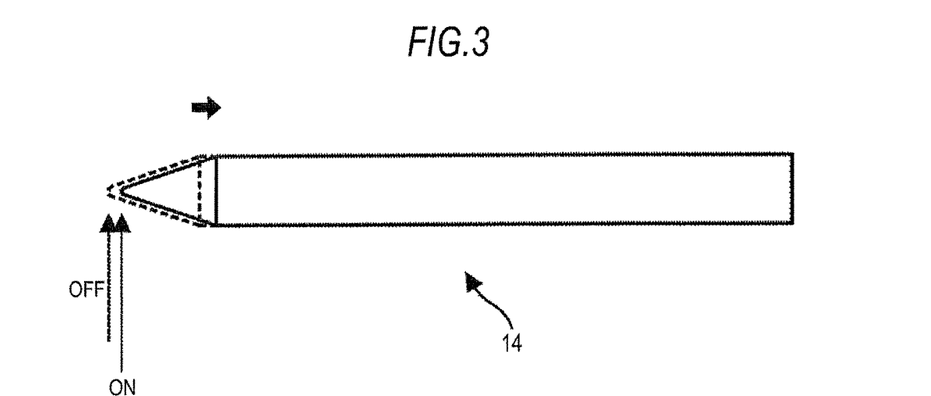
FIG. 3 shows an external appearance of a pointing pen.

FIG. 3 shows an external appearance of the pointing pen 14.

The pointing pen 14 is so configured that the front end thereof has a substantially conical shape and moves in the direction indicated by the arrow when the front end is pressed, as shown in FIG. 3. The position indicated by the broken line represents the OFF state of the switch 61. When pressed, the front end of the pointing pen 14 moves from the position indicated by the broken line to the position indicated by the solid line. The switch 61 is thus turned on.

[Example of First Configuration of Pointing Pen 14]

As the configuration of the pointing pen 14 capable of outputting infrared light having two types of signal level, the low level and the high level, the following first and second configurations can, for example, be employed.

Figure 4:
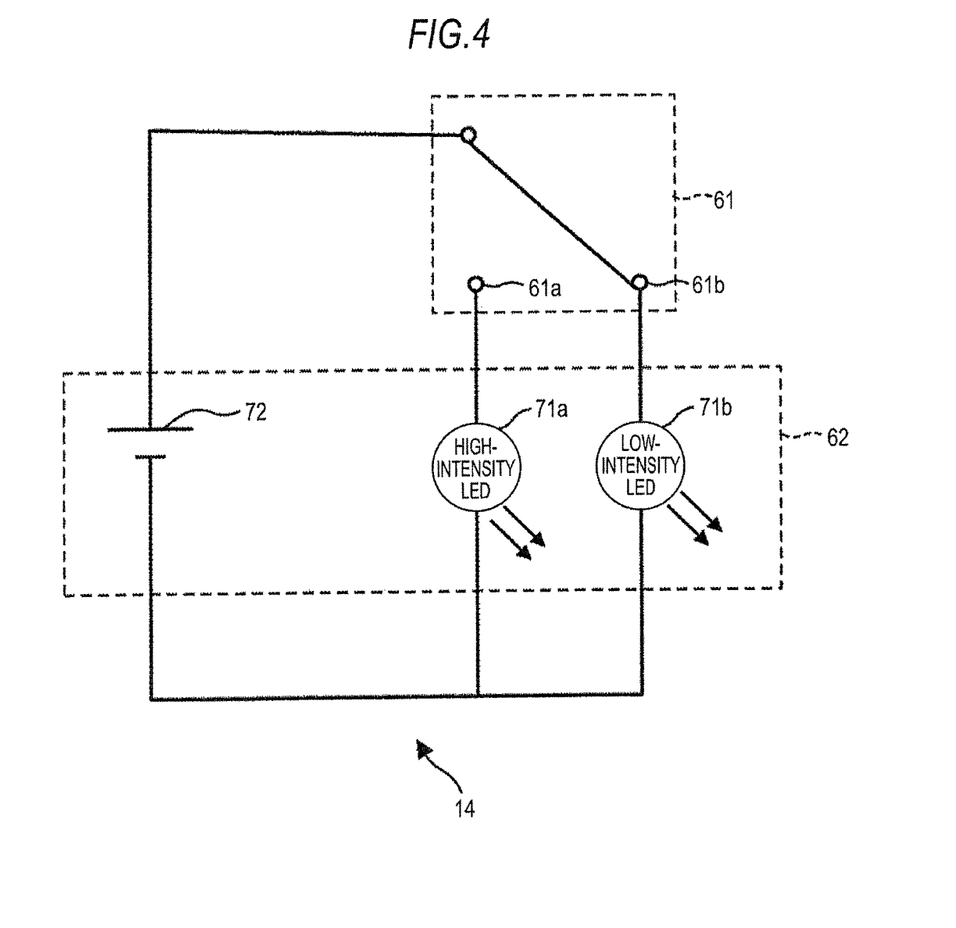
FIG. 4 shows an example of a first configuration of the pointing pen.

FIG. 4 shows an example of the first configuration of the pointing pen 14.

As the infrared signal output section 62, the pointing pen 14 includes a high-intensity LED 71a that emits high-intensity infrared light, a low-intensity LED 71b that emits low-intensity infrared light, and a power supply 72.

The switch 61, when the state of which is OFF, is electrically continuous with a terminal 61b connected to the low-intensity LED 71b, whereas, when the state of which is ON, being electrically continuous with a terminal 61a connected to the high-intensity LED 71a.

In this configuration, when the state of the switch 61 is OFF, the power supply 72 energizes the low-intensity LED 71b, and the pointing pen 14 emits low-intensity (low-level) infrared light. On the other hand, when the state of the switch 61 is ON, the power supply 72 energizes the high-intensity LED 71a, and the pointing pen 14 emits high-intensity (high-level) infrared light.

[Example of Second Configuration of Pointing Pen 14]

Figure 5:
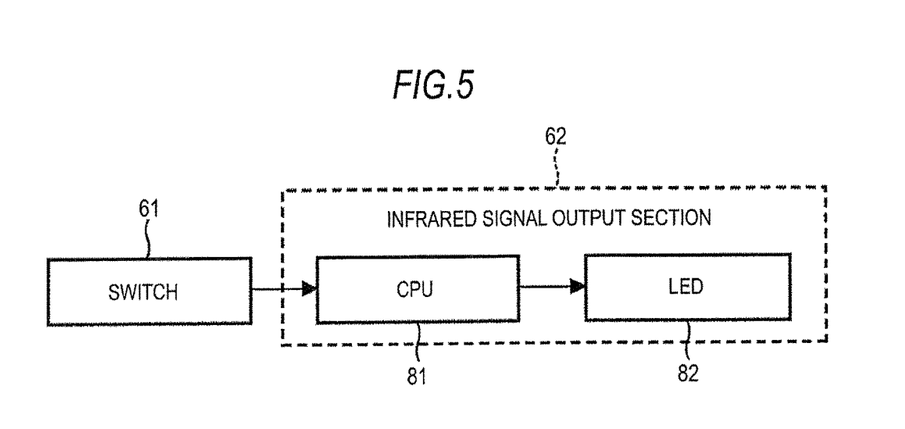
FIG. 5 shows an example of a second configuration of the pointing pen.

FIG. 5 shows an example of the second configuration of the pointing pen 14.

As the infrared signal output section 62, the pointing pen 14 includes a CPU 81 and an LED 82.

The CPU 81 detects the ON/OFF state of the switch 61 and changes the duty ratio between a light-on period and a light-off period of the LED 82 in accordance with the state of the switch 61. The LED 82 outputs fixed-level infrared light under the control of the CPU 81.

Figure 6A:
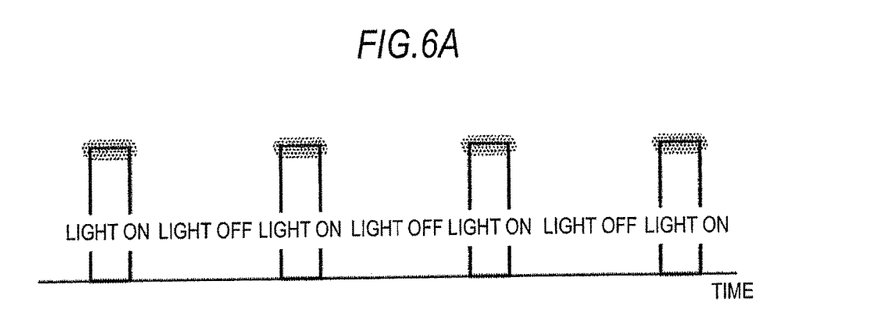
FIGS. 6A and 6B describe the example of the second configuration of the pointing pen.

A detailed description will be made with reference to FIGS. 6A and 6B. When the state of the switch 61 is OFF, the CPU 81 controls the light-on/off periods of the LED 82 or the duty ratio in such a way that the light-off period of the LED 82 is longer than the light-on period thereof, as shown in FIG. 6A. On the other hand, when the state of the switch 61 is ON, the CPU 81 controls the light-on/off periods of the LED 82 or the duty ratio in such a way that the light-off period of the LED 82 is shorter than the light-on period thereof, as shown in FIG. 6B.

Since the signal level detected by the imaging section 51 in the IR camera 13 is proportional to an accumulated value of the light-on period of the LED 82, two types of output, the lower level and the high level, are achieved by controlling the duty ratio between the light-on period and the light-off period of the LED 82 as described above.

Figure 6B:
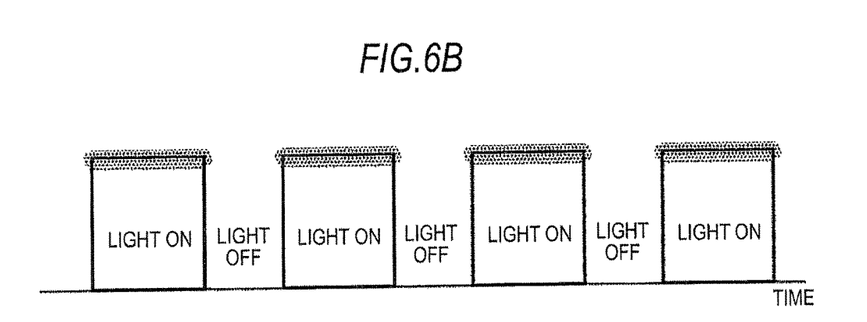

In the example of FIGS. 6A and 6B, the relationship between the length of the light-on period and the length of the light-off period is reversed when the ON state is changed to the OFF state and vice versa. The relationship is not necessarily reversed as long as the light-on period in the ON state is longer than that in the OFF state.

The above description has been made with reference to the two exemplary configurations for outputting two types of infrared light, the high-level infrared light and the low-level infrared light, from the pointing pen 14. The configuration for outputting the two types of infrared light is not limited to the above configurations, and other configurations can be employed as long as two types of infrared light, high-level infrared light and lower-level infrared light, are outputted.

[Operation of Pointing Pen 14]

Figure 7:
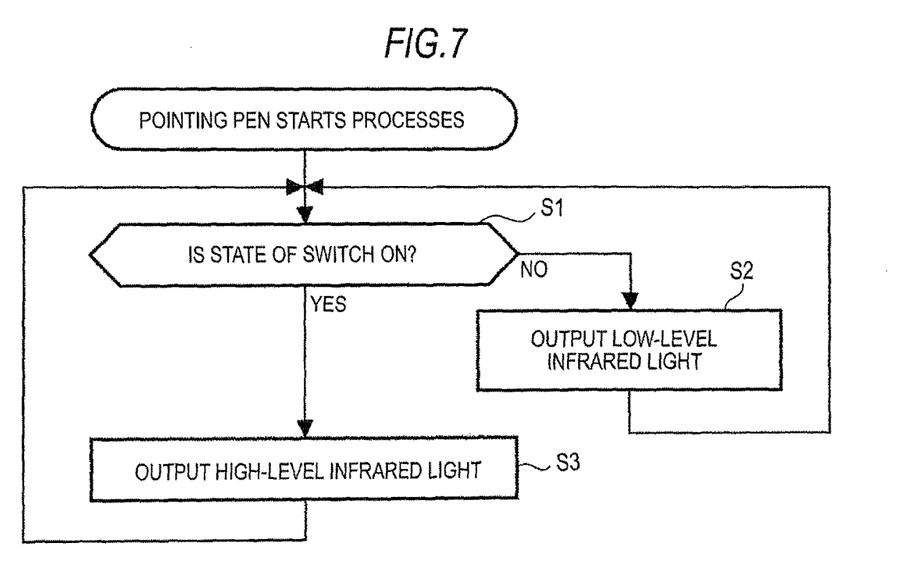
FIG. 7 is a flowchart for describing processes carried out by the pointing pen.

FIG. 7 is a flowchart for describing processes (operation) carried out by the pointing pen 14.

First, in step S1, the pointing pen 14 judges whether the state of the switch 61 is ON.

When the judgment result in step S1 shows that the state of the switch 61 is not ON (is OFF), the control proceeds to step S2, where the pointing pen 14 outputs the low-level infrared light.

On the other hand, when the judgment result in step S1 shows that the state of the switch 61 is ON, the control proceeds to step S3, where the pointing pen 14 outputs the high-level infrared light.

After step S2 or S3, the control returns to step S1, and the processes in steps S1 to S3 described above are repeated until the pointing pen 14 is turned off.

[Description of Calibration Mode]

The calibration mode will now be described with reference to FIG. 8.

Figure 8:
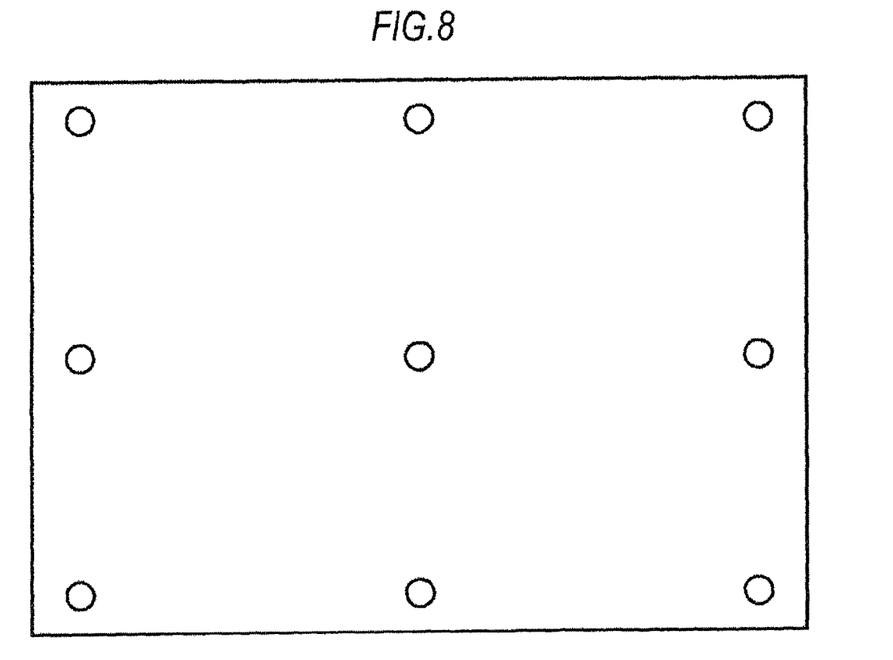
FIG. 8 describes a calibration mode.

When the calibration mode starts in the presentation application activated in the PC 11, an image signal carrying the image shown in FIG. 8 is supplied from the PC 11 to the projector 12, which projects the image shown in FIG. 8 on the screen 15.

FIG. 8 shows an image having 9 (3×3) circles (O) uniformly arranged in the vertical and horizontal directions of the projection area (display area) of the projector 12.

Before the image is displayed or at the same time when the image is displayed, the presentation application outputs an audio or visual message, such as "Touch the 9 marks sequentially with the pointing pen 14." It is assumed that the order in which the 9 marks are touched is determined in advance or recognized by the user who has been informed of the order in advance.

The pointed position correction section 33 in the PC 11 corrects the positional relationship between an image displayed on the screen 15 and an image displayed on the image display section 31 by relating (click positions contained in) click information supplied when the user touches the marks to the marks on the displayed image on the image display section 31.

On the other hand, in the calibration mode, the IR camera 13 carries out a threshold determination process of determining a threshold based on which the two types of signal level, the low level and the high level, of the infrared light from the pointing pen 14 are identified.

Figure 9:
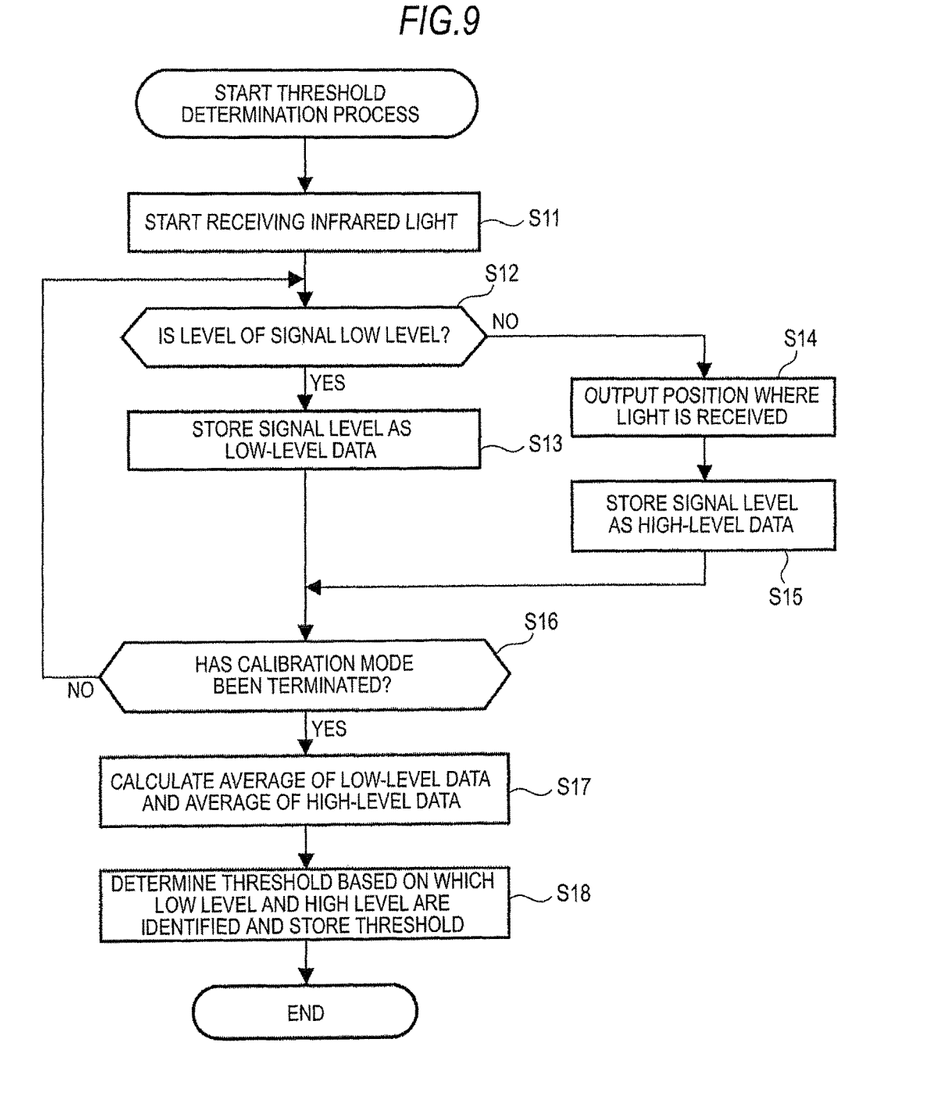
FIG. 9 is a flowchart for describing a threshold determination process.

FIG. 9 is a flowchart of the threshold determination process carried out by the IR camera 13 when the PC 11 informs the IR camera 13 that the calibration mode has started.

First, in step S11, the imaging section 51 starts receiving the infrared light emitted from the pointing pen 14. That is, the imaging section 51 supplies the signal processor 52 with an imaged signal obtained when the imaging device receives light.

In step S12, the signal processor 52 calculates the signal level of the infrared light from the pointing pen 14 based on the imaged signal supplied from the imaging section 51 and judges whether the calculated signal level is the low level. It is assumed that the range of the output level that can be detected as each of the low level and the high level is known. The signal processor 52 evaluates whether the calculated signal level falls within the range of the low level or the range of the high level to judge whether the calculated signal level is the low level.

In the calibration mode, the user sequentially touches the marks displayed on the screen 15 with the pointing pen 14, as described with reference to FIG. 8. When the user has touched any of the marks with the pointing pen 14, the switch 61 of the pointing pen 14 is turned on, and the signal processor 52 acquires the high-level infrared light. On the other hand, when the user has not touched any of the marks with the pointing pen 14, the signal processor 52 acquires the low-level infrared light.

When the judgment result in step S12 shows that the calculated signal level is the low level, the control proceeds to step S13, and the signal processor 52 stores (accumulates) the calculated signal level as low-level data in a built-in temporary memory.

On the other hand, when the judgment result in step S12 shows that the calculated signal level is the high level, the control proceeds to step S14, and the signal processor 52 outputs click information to the PC 11 via the projector 12, the click information calculated based on the imaged signal and representing the position where the infrared light from the pointing pen 14 is detected.

In step S15, the signal processor 52 stores (accumulates) the calculated signal level as high-level data in the built-in temporary memory.

After step S13 or S15 has been carried out, in step S16, the signal processor 52 judges whether the calibration mode has been terminated, that is, the PC 11 has informed the signal processor 52 of termination of the calibration mode.

When the judgment result in step S16 shows that the calibration mode has not been terminated, the control returns to step S12, and the processes in steps S12 to S16 described above are repeated.

On the other hand, when the judgment result in step S16 shows that the calibration mode has been terminated, the control proceeds to step S17, and the signal processor 52 calculates the average of the low-level data and the average of the high-level data stored in the temporary memory.

In step S18, the signal processor 52 uses the calculated averages of the low-level data and the high-level data to determine the threshold based on which the low level and the high level are identified, stores the threshold in the threshold storage section 53, and terminates the threshold determination process. For example, when the average of the low-level data is "5" and the average of the high-level data is "10", the threshold is determined to be "7.5", which is the median of the two averages.

As described above, the IR camera 13 classifies the signal level of each received optical signal into the low level or the high level concurrently with the calibration mode, in which the positions of displayed images are corrected in the PC 11. The IR camera 13 then determines the threshold based on which the low level and the high level are identified based on the accumulated low-level and high-level data. The IR camera 13 then stores the threshold.

The signal level of the infrared light received by the IR camera 13 changes in accordance with the distance over which the projector 12 projects an image, that is, the distance from the IR camera 13, which is connected and fixed to the projector 12, to the screen 15 (pointing pen 14).

The pointing pen 14 is typically used with a dry battery or a secondary battery as the power supply, and the output level of the infrared light also changes in accordance with the amount of electricity left in the battery.

In view of the facts described above, an optimum threshold can be determined and set whenever the IR camera 13 carries out the threshold determination process shown in FIG. 9 in the calibration mode, which the user carries out whenever starting using the projector 12. In this process, the user recognizes that the calibration mode is carried out but does not recognize that the threshold is being set (the threshold is automatically set).

[Description of Normal Mode]

A description will next be made of how the normal mode is carried out after the calibration mode is completed.

Figure 10:
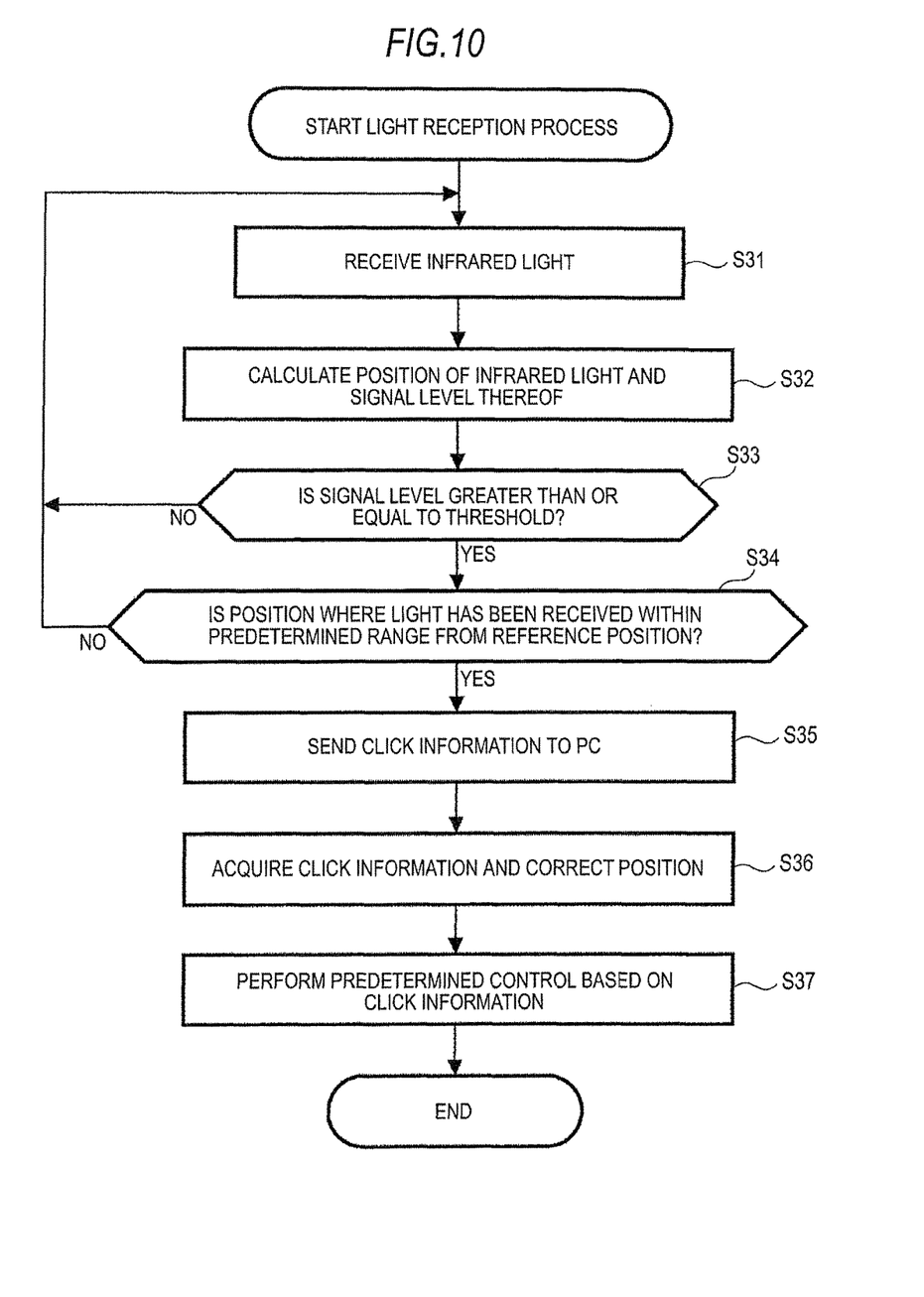
FIG. 10 is a flowchart for describing a light reception process.

FIG. 10 is a flowchart of a light reception process carried out in the normal mode by the IR camera 13 that receives the infrared light from the pointing pen 14.

First, in step S31, the imaging section 51 in the IR camera 13 receives the infrared light outputted from the pointing pen 14. The imaging section 51 supplies the signal processor 52 with an imaged signal provided as a result of the light reception.

In step S32, the signal processor 52 calculates the position of the infrared light from the pointing pen 14 and the signal level of the infrared light based on the imaged signal supplied from the imaging section 51.

In step S33, the signal processor 52 judges whether the calculated signal level is greater than or equal to the threshold determined in the calibration mode, that is, whether the high-level infrared light has been received.

When the judgment result in step S33 shows that the calculated signal level is not greater than or equal to the threshold, that is, when the low-level infrared light has been received, the control returns to step S31.

On the other hand, when the judgment result in step S33 shows that the calculated signal level is greater than or equal to the threshold, that is, when the high-level infrared light has been received, the control proceeds to step S34. In step S34, the signal processor 52 judges whether the position where the light has been received is within a predetermined range from the reference position, which is a position of the low-level infrared light received immediately before the high-level infrared light is received.

When the judgment result in step S34 shows that the position where the light has been received does not fall within the predetermined range from the reference position, the control returns to step S31.

On the other hand, when the judgment result in step S34 shows that the position where the light has been received falls within the predetermined range from the reference position, the control proceeds to step S35.

In step S35, the signal processor 52 sends click information representing that the user had clicked on the position where the infrared light has been received to the PC 11 via the projector 12.

In step S36, the pointed position correction section 33 in the PC 11 acquires the click information sent from the IR camera 13 via the projector 12 and corrects the position contained in the click information based on the correction value stored in the position correction information storage section 34. The pointed position correction section 33 then supplies the image generation section 32 with the corrected click information.

In step S37, the image generation section 32 performs predetermined control, such as displaying the following image used in the presentation, based on the click information supplied from the pointed position correction section 33 and representing that the user has clicked on a predetermined position on the image displayed on the screen 15. As a result, the user can click on the image projected on the screen 15 as if the user clicked on the image displayed on the display 11D.

It is noted that the processes shown in FIG. 10 have been presented as the procedure of the processes, and that, in practice, each of the IR camera 13, the projector 12, and the PC 11 repeatedly carries out the relevant processes in the steps.

As described above, in the presentation system 1 shown in FIG. 1, the pointing pen 14 keeps outputting the low-level infrared light, whereas outputting the high-level infrared light only when the switch 61 is turned on. The IR camera 13, which normally captures the low-level infrared light emitted from the pointing pen 14, outputs click information to the PC 11 only when the IR camera 13 has received the high-level infrared light in the vicinity of the position where the IR camera 13 had received the low-level infrared light.

In this way, the IR camera 13 will not accidentally output click information even when the IR camera 13 receives infrared light having the same wavelength band outputted from the remote control unit 12R of the projector 12, or the IR camera 13 will not judge the infrared light from the remote control unit 12R to be the infrared light from the pointing pen 14. That is, two signals having the same wavelength band but used for different purposes can be correctly distinguished from each other.

In related art, when the remote control unit 12R of the projector 12 and an interactive pen are used simultaneously, infrared light from the remote control unit 12R causes malfunction in some cases, and the user has to disable, the remote control unit 12R. Using the present technology, however, allows the remote control unit 12R and an interactive pen to be used simultaneously, whereby the convenience of the user is improved. Further, in a case where two types of infrared light, low-level infrared light and high-level infrared light, are received, allowing the high-level infrared light to be detected only in the vicinity of the position where the low-level infrared light has been received improves the responsivity of the system.

[Variations]

Embodiments of the present technology are not limited to the embodiment described above, but a variety of changes can be made thereto to the extent that the changes do not depart from the substance of the present technology.

For example, in the example described above, the pointing pen 14 has a pen-like shape, and the ON/OFF state of the switch 61 is changed when the front end of the pointing pen 14 comes into contact with (is pressed against) an object. The pointing pen 14 may alternatively be provided with an operation button, and the ON/OFF state of the switch 61 may be changed by operating the operation button.

Further, for example, the pointing pen 14 does not necessarily have the pen-like shape described above but may be an expandable pointing stick, may fit on a finger, or may be any optical signal output apparatus capable of outputting infrared light of two output levels that can be switched by switching operation.

Further, in the example described above, the optical signal outputted from the pointing pen 14, which is an optical signal output apparatus, is infrared light having a wavelength band ranging from 780 to 1000 nm. Alternatively, light having any other suitable wavelength band, for example, ultraviolet light of 400 nm or lower or visible light ranging from 420 to 480 nm (blue light), may be used.

In the example described above, the IR camera 13 is externally attached to the projector 12. The IR camera 13 can alternatively be incorporated in the projector 12. That is, the projector 12 may include the IR camera 13 as part of the configuration thereof.

In the example described above, the IR camera 13 sends click information to the PC 11 only when the IR camera 13 receives the high-level infrared light. Since the IR camera 13 keeps receiving infrared light, positional information may also keep being sent to the PC 11. In this case, the pointing pen 14 can operate as a mouse device. The IR camera 13 may be so configured that the operation thereof is switched by a switch between a mouse device operation in which positional information keeps being outputted and a tablet device operation in which positional information is outputted only when clicking occurs.

The calibration mode has been described with reference to FIG. 8, in which 9 marks are touched, but the number of marks to be touched is not limited to 9. Further, the user may be informed of the order of touching of the marks by displaying each mark to be touched differently from the other marks, such as blinking the marks in the order in which they are touched.

[Example of Configuration of Computer]

The series of processes described above can be carried out by either hardware or software. To carry out the series of processes by software, a program containing the software is installed in a computer. The computer may be a computer incorporated in dedicated hardware, a general-purpose personal computer capable of performing a variety of functions by installing a variety of programs, or any other suitable computer.

Figure 11:
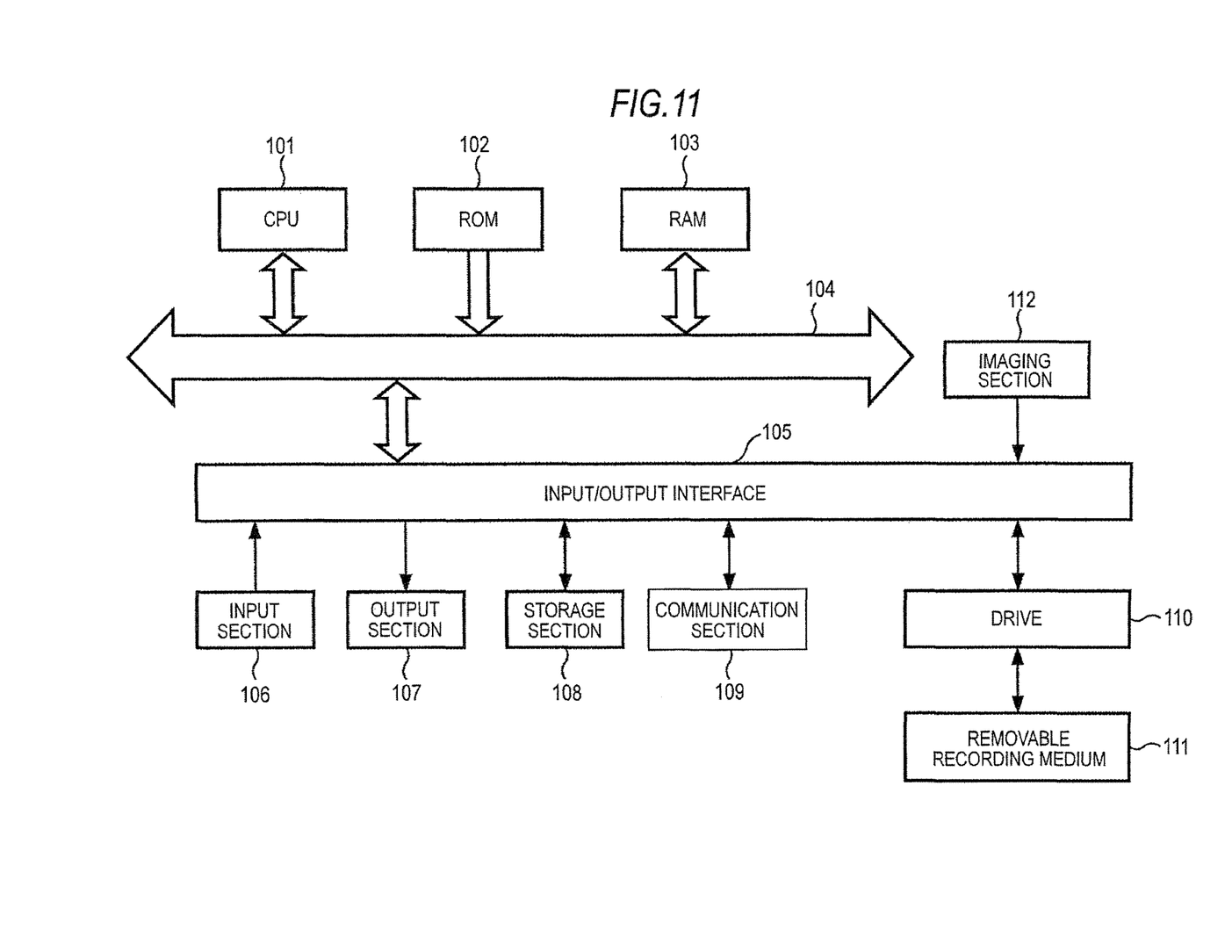
FIG. 11 is a block diagram showing an example of the configuration of an embodiment of a computer to which the present technology is applied.

FIG. 11 is a block diagram showing an example of the configuration of the hardware of a computer that uses a program to carry out the series of processes described above.

In the computer, a CPU (central processing unit) 101, a ROM (read only memory) 102, a RAM (random access memory) 103 are interconnected via a bus 104.

An input/output interface 105 is also connected to the bus 104. An input section 106, an output section 107, a storage section 108, a communication section 109, and a drive 110 are connected to the input/output interface 105.

The input section 106 is formed, for example, of a keyboard, a mouse, and a microphone. The output section 107 is formed, for example, of a display and a loudspeaker. The storage section 108 is formed, for example, of a hard disk drive and a non-volatile memory. The communication section 109 is formed, for example, of a network interface. The drive 110 drives a removable recording medium 111, such as a magnetic disk, an optical disk, a magneto-optical disk, and a semiconductor memory.

An imaging section 112 corresponds to the imaging section 51 shown in FIG. 2. The imaging section 112 images the projection area and supplies an imaged signal as a result of the imaging to the CPU 101 and other components via the input/output interface 105.

In the thus configured computer, the CPU 101, for example, loads a program stored in the storage section 108 into the RAM 103 via the input/output interface 105 and the bus 104 and executes the program to carry out the series of processes described above.

In the computer, the program can be installed in the storage section 108 via the input/output interface 105 by loading the removable recording medium ill into the drive 110. The program can alternatively be installed in the storage section 108 by receiving it through the communication section 109 via a wired or wireless transmission medium, such as a local area network, the Internet, and digital satellite broadcasting. Still alternatively, the program can be installed in advance in the ROM 102 or the storage section 108.

The steps described in the flowcharts in the present specification may be, but not necessarily, carried out successively in the time sequence in the described order or may be carried out concurrently, or each of the steps may be carried out at a necessary timing, for example, when the step is called.

The term "system" used herein represents the entire apparatus formed of a plurality of devices.

The present technology may be embodied in the following configuration.

(1) An optical signal output apparatus including
a switch having a first state or a second state in accordance with user's operation, and
an optical signal output section that outputs a low-level optical signal when the switch is in the first state, whereas outputting a high-level optical signal when the switch is in the second state.

(2) The optical signal output apparatus described in (1),
wherein the optical signal output section outputs two types of optical signal, the low-level optical signal and the high-level optical signal, by changing the ratio between a light-on period and a light-off period.

(3) The optical signal output apparatus described in (1),
wherein the optical signal output section includes a first light emitter that outputs a high-intensity optical signal as the high-level optical signal and a second light emitter that outputs a low-intensity optical signal as the low-level optical signal.

(4) The optical signal output apparatus described in any of (1) to (3),
wherein the optical signal is infrared light.

(5) A signal processing apparatus including
an optical signal processor that, when an optical signal having a signal level greater than or equal to a predetermined threshold is detected based on an imaged signal obtained by an imaging section that images an optical signal outputted from the optical signal output apparatus that outputs a low-level optical signal or a high-level optical signal, outputs information on the position of the optical signal.

(6) The signal processing apparatus described in (5),
wherein the optical signal processor calculates the signal level of the optical signal based on the imaged signal, judges whether the calculated signal level of the optical signal is greater than or equal to the predetermined threshold, and outputs the information on the position of the optical signal when the judgment result shows that the calculated signal level is greater than or equal to the predetermined threshold.

(7) The signal processing apparatus described in (5) or (6),
wherein the optical signal processor outputs the information on the position of the optical signal when the position of the imaged optical signal having a signal level greater than or equal to the predetermined threshold is within a predetermined range from the position of the optical signal imaged immediately before the optical signal having a signal level greater than or equal to the predetermined threshold is imaged.

(8) The signal processing apparatus described in any of (5) to (7),
wherein the optical signal processor classifies the signal level of the optical signal into the low level and the high level, accumulates the classified low-level and high-level data, and determines the predetermined threshold based on the accumulated low-level data and high-level data.

(9) The signal processing apparatus described in any of (5) to (8),
wherein the optical signal is infrared light.

(10) The signal processing apparatus described in any of (5) to (9),
wherein the optical signal processor outputs the information on the position of the optical signal as part of click information.

(11) A signal processing method including
allowing a signal processing apparatus, that performs signal processing based on an imaged signal obtained by an imaging section that images an optical signal outputted from an optical signal output apparatus that outputs a low-level optical signal or a high-level optical signal, to output information on the position of the optical signal when an optical signal having a signal level greater than or equal to a predetermined threshold is detected.

(12) An imaging apparatus including
an imaging section that images an optical signal outputted from an optical signal output apparatus that outputs a low-level optical signal or a high-level optical signal, and
an optical signal processor that, when an optical signal having a signal level greater than or equal to a predetermined threshold is detected based on an imaged signal obtained by an imaging section, outputs information on the position of the optical signal.

(13) A projector including
the imaging apparatus described in (12).

The present disclosure contains subject matter related to that disclosed in Japanese Priority Patent Application JP 2011-064051 filed in the Japan Patent Office on Mar. 23, 2011, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:
1. A presentation system comprising:
an optical signal output apparatus including a switch configured at a front edge of a housing of the optical signal output apparatus, the switch having a first state when the front edge of the optical signal output apparatus does not touch a projection screen, and the switch having a second state while the front edge of the optical signal output apparatus touches the projection screen, the optical signal output apparatus configured to output two types of optical signals including a low-level optical signal when the switch is at the first state and a high-level optical signal when the switch is at the second state;
a projection device including
an image generator configured to generate an image including a plurality of marks so as to calibrate positional information between a display position of the projection screen and a display position of a computer, and
an optical signal processor configured to detect the low-level optical signal and the high-level optical signal output by the optical signal output apparatus, determine whether to perform a click operation based on a change of a signal level from the low-level optical signal to the high-level optical signal, and output to the computer positional information corresponding to the display position of the projection screen based on the determination of the click operation when the image is displayed on the projection screen.

2. The presentation system of claim 1, wherein the optical signal output apparatus outputs the two types of optical signals by changing a ratio between a light-on period and a light-off period.

3. The presentation system of claim 1, wherein the optical signal output apparatus includes a first light emitter that outputs a high-intensity optical signal as the high-level optical signal and a second light emitter that outputs a low-intensity optical signal as the low-level optical signal.

4. The presentation system of claim 1, wherein the low-level optical signal and the high-level optical signal are infrared light.

5. The presentation system of claim 1, wherein the optical signal processor outputs the positional information of a first optical signal when a position of the first optical signal having a signal level greater than or equal to a predetermined threshold is within a predetermined range from a position of a second optical signal that is immediately before the first optical signal.

6. The presentation system of claim 1, wherein the optical signal output apparatus is a pen shape.

7. The presentation system of claim 1, wherein the plurality of marks are uniformly arranged in vertical and horizontal directions of the screen.

8. A presentation system comprising:
an optical signal output apparatus including a switch configured at a front edge of a housing of the optical signal output apparatus, the switch having a first state when the front edge of the optical signal output apparatus does not touch a projection screen, and the switch having a second state while the front edge of the optical signal output apparatus touches the projection screen,
the optical signal output apparatus configured to output two types of optical signals including a low-level optical signal when the switch is at the first state and a high-level optical signal when the switch is at the second state;
a projection device including
an image generator configured to generate an image including a plurality of marks so as to calibrate positional information between a display position of the projection screen and a display position of a computer,
a camera configured to detect the low-level optical signal and the high-level optical signal output by the optical signal output apparatus on the screen, and
an optical signal processor configured to determine whether to perform a click operation based on a change of a signal level from the low-level optical signal to the high-level optical signal detected by the camera, and
output to the computer positional information corresponding to the display position of the projection screen based on the determination of the click operation when the image is displayed on the projection screen.

9. The presentation system of claim 8, wherein the optical signal output apparatus outputs the two types of optical signals by changing a ratio between a light-on period and a light-off period.

10. The presentation system of claim 8, wherein the optical signal output apparatus includes a first light emitter that outputs a high-intensity optical signal as the high-level optical signal and a second light emitter that outputs a low-intensity optical signal as the low-level optical signal.

11. The presentation system of claim 8, wherein the low-level optical signal and the high-level optical signal are infrared light.

12. The presentation system of claim 8, wherein the optical signal processor outputs the positional information of a first optical signal when a position of the first optical signal having a signal level greater than or equal to predetermined threshold is within a predetermined range from a position of a second optical signal that is immediately before the first optical signal.

13. The presentation system of claim 8, wherein the optical signal output apparatus is a pen shape.

14. The presentation system of claim 8, wherein the plurality of marks are uniformly arranged in vertical and horizontal directions of the screen.

* * * * *